(12) United States Patent
Yim et al.

(10) Patent No.: US 9,300,856 B2
(45) Date of Patent: Mar. 29, 2016

(54) IMAGE ENCODING APPARATUS AND METHOD OF CAMERA DEVICE

(71) Applicant: Samsung Electronics Co. Ltd., Suwon-si, Gyeonggi-do (KR)

(72) Inventors: Sungjun Yim, Seoul (KR); Myoungwon Kim, Seoul (KR); Moonsoo Kim, Seoul (KR); Jaedong Kim, Seoul (KR); Kangmin Lee, Suwon-si (KR); Jongheum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/870,640

(22) Filed: Apr. 25, 2013

(65) Prior Publication Data

US 2013/0293737 A1    Nov. 7, 2013

(30) Foreign Application Priority Data

May 2, 2012    (KR) ......................... 10-2012-0046514

(51) Int. Cl.
*H04N 5/235* (2006.01)
*H04N 5/232* (2006.01)
*G06K 9/42* (2006.01)
*H04N 101/00* (2006.01)

(52) U.S. Cl.
CPC ........... *H04N 5/23212* (2013.01); *H04N 5/232* (2013.01); *H04N 2101/00* (2013.01)

(58) Field of Classification Search
CPC  H04N 2101/00; H04N 5/232; H04N 5/23212
USPC ............ 348/222.1, 345, 14.13; 382/235, 239, 382/261, 274
See application file for complete search history.

(56) References Cited

U.S. PATENT DOCUMENTS

| 2006/0126954 | A1 | 6/2006 | Kim | |
|---|---|---|---|---|
| 2007/0201851 | A1* | 8/2007 | Misawa | G03B 13/18 396/125 |
| 2011/0007182 | A1* | 1/2011 | Yamada | H04N 1/4074 348/224.1 |
| 2012/0062767 | A1* | 3/2012 | Satomi | H04N 9/7921 348/231.99 |
| 2013/0156095 | A1* | 6/2013 | Li | H04N 21/233 375/240.02 |

FOREIGN PATENT DOCUMENTS

KR    10-0601475  B1    7/2006

* cited by examiner

*Primary Examiner* — Trung Diep
(74) *Attorney, Agent, or Firm* — Jefferson IP Law, LLP

(57) ABSTRACT

An apparatus and method for adjusting compression rate based on the image size analysis in a camera device are provided. The image processing apparatus includes a compression rate determiner which determines a compression rate according to complexity of an image by extracting auto focus filter values of the image acquired from the camera, a processor which processes the image acquired from the camera in a unit of the line, and a still image codec which compresses line images output from the processor at the compression rate.

13 Claims, 7 Drawing Sheets

FIG. 4B

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

| 6 | 4 | 4 | 6 | 10 | 16 | 20 | 24 |
|---|---|---|---|----|----|----|----|
| 5 | 5 | 6 | 8 | 9 | 23 | 24 | 22 |
| 6 | 5 | 6 | 10 | 16 | 23 | 28 | 22 |
| 6 | 7 | 9 | 12 | 20 | 35 | 32 | 25 |
| 7 | 9 | 15 | 22 | 27 | 44 | 41 | 31 |
| 10 | 14 | 22 | 26 | 32 | 42 | 445 | 37 |
| 20 | 26 | 31 | 35 | 41 | 48 | 48 | 40 |
| 29 | 37 | 38 | 39 | 45 | 40 | 41 | 40 |

...

AF Filter value > 40000000

40000000 >= AF Filter value > 37500000

...

IMAGE ENCODING APPARATUS AND METHOD OF CAMERA DEVICE

PRIORITY

This application claims the benefit under 35 U.S.C. §119 (a) of a Korean patent application filed on May 2, 2012 in the Korean Intellectual Property Office and assigned Serial No. 10-2012-0046514, the entire disclosure of which is hereby incorporated by reference.

BACKGROUND OF THE INVENTION

1. Field of the Invention

The present invention relates to an image encoding apparatus and method of a camera device. More particularly, the present invention relates to an apparatus and method for adjusting a compression rate based on an image size analysis.

2. Description of the Related Art

A camera device may compress an image in such a way that an image sensor acquires an image and transfers the image data to an image processor and the image processor encodes the image data compressively by means of an internal encoder. Here, the image processor increases the compression rate for a complex image to reduce the data amount of the image and decreases the compression rate for a simple image to increase the image quality.

Typically, the image processor of the camera device processes the buffered image data in a unit of a frame. In this case, the image processor analyzes the image data provided by the camera in the unit of the frame and adjusts the compression encoding rate based on the per-frame image complexity. In the case where the image processor uses line buffers for processing image data per line other than the frame buffer, however, the image processor cannot know the complexity of the image in advance and thus it is impossible to determine the compression rate. Accordingly, in the case of the camera device using the line buffer type memory other than the frame buffer type memory, the image processor undergoes the difficulty of adjusting a compression rate in advance and, the image with a size exceeding a predetermined data rate causes errors in the image.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an encoding apparatus and method that is capable of compressing an image efficiently based on the complexity of the acquired image data even in the case of using the line buffer type image processor which processes the image acquired by the camera of a camera device. The image processor according to an exemplary embodiment of the present invention estimates, when an image is acquired by the camera, a size of the image based on the auto-focusing result value and adjusts the compression rate based on the estimation result.

In accordance with an aspect of the present invention, an image processing apparatus of a camera is provided. The apparatus includes a compression rate determiner which determines a compression rate according to complexity of an image by extracting auto focus filter values of the image acquired from the camera, a processor which processes the image acquired from the camera in a unit of the line, and a still image codec which compresses line images output from the processor at the compression rate.

In accordance with another aspect of the present invention, an image processing method of a camera is provided. The method includes determining a compression rate according to complexity of an image by extracting auto focus filter values of the image acquired from the camera, processing the image acquired from the camera in a unit of a line, and compressing the processed line images at the compression rate.

In accordance with still another aspect of the present invention, a camera device is provided. The device includes a camera which takes images, an image processor including a compression rate determiner for determining a compression rate according to complexity of an image by extracting auto focus filter values of the image acquired from the camera, and generating a viewing image and a compressed image by compressing the image acquired from the camera in a unit of a line according to the compression rate, an application processor which controls buffering the viewing and compressed images output from the image processor in a unit of a frame and storing the compressed image buffered in the unit of the frame in response to a capture request, a display unit which displays the viewing image output from the application processor in the unit of the frame, and a storage which stores the compressed image output from the application processor in the unit of the frame.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4B is a diagram illustrating a principle of retrieving a filter value in a configured window region according to an exemplary embodiment of the present invention;

DETAILED DESCRIPTION OF EXEMPLARY EMBODIMENTS

Figure 1:
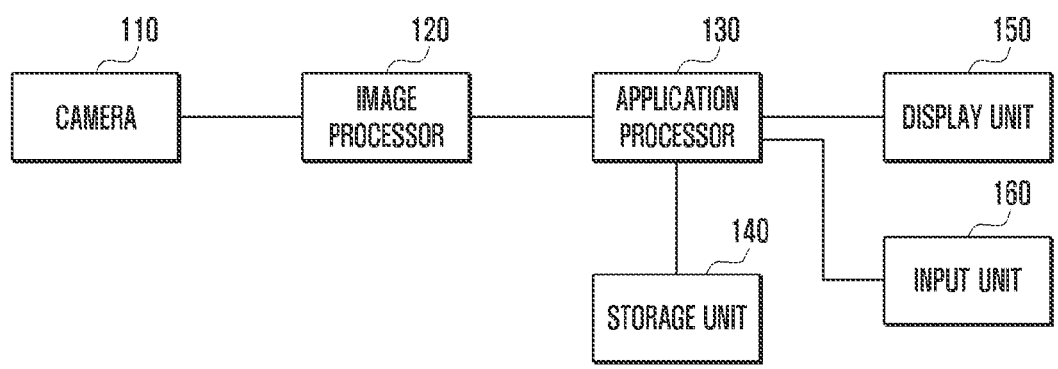
FIG. 1 is a block diagram illustrating a configuration of a camera device or a camera-equipped terminal device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although a description is made herein with reference to numerous specific details such as an auto focus filter value to provide a thorough understanding of exemplary embodiments of the present invention, those skilled in the art will appreciate that the present invention can be practiced without some or all of these specific details. Detailed description of well-known functions and structures incorporated herein may be omitted to avoid obscuring the subject matter of the present invention.

The present disclosure includes techniques to determine the complexity of an image using Edge Data of the image acquired in an Auto Focus (AF) process of an image processor of a camera device and adjusts the compression encoding rate of the image data based on the complexity. Here, the line image can be a one line image or plural lines images. For example, the line image processed by the image processor can be the image corresponding to the data of one or more lines.

In the exemplary embodiments of the present invention, the term 'processor' is used as a concept encompassing pre-processor and post-processor, the preview mode and the motion image recording mode are the modes of displaying the motion image on the display screen, and the capture mode is the operation mode for capturing and storing a still image. In the exemplary embodiments of the present invention, the descriptions are directed to the case where the compression rate determiner for determining the compression rate of a still image is incorporated in the pre-processor. However, the compression rate determiner can be configured independently in the image processor.

The image processor according to an exemplary embodiment of the present invention extracts an AF Filter value when Auto Focusing the image acquired by the image sensor of the camera, analyzes the extracted AF Filter value, and determines whether the image is a simple image capable of using a Default Q factor for image compression based on a result of the analysis. If it is determined that the image is the simple image capable of using the Default Q factor, the image processor performs Joint Photographic Experts Group (JPEG) encoding at a related-art default compression rate and, otherwise if it is determined that the image is the complex image, at a compression rate determined by adjusting a JPEG Q factor.

FIG. 1 is a block diagram illustrating a configuration of a camera device or a camera-equipped terminal device according to an exemplary embodiment of the present invention. In the following description, the term 'camera device' is used as a concept encompassing a camera-equipped terminal device.

Referring to FIG. 1, the camera 110 is provided with an image sensor to acquire an image in a power-on state of a camera. The camera 110 includes an optical image sensor and a signal processor. The optical unit is driven by a Mecha-shutter, a motor, and an actuator, and performs operations such as zooming and focusing by means of the actuator. The optical unit takes the image of the subject, and the image sensor converts the image taken by the optical image into an electric signal. Here, the image censor can be a Complementary Metal-oxide-Semiconductor (CMOS) or Charge-Coupled Device (CCD) sensor or a higher resolution image sensor. The image sensor of the camera may incorporate a global shutter. The global shutter performs a function similar to the Mecha-shutter embedded in the sensor.

In an exemplary embodiment of the present invention, the image sensor can be the sensor capable of sensing the image of Ultra High Definition (UHD) or higher resolution. The image sensed by the image sensor is converted into a digital image by the signal processor. The output data of the camera 110 can be the Bayer data (e.g., raw data).

The image processor (e.g., Image Signal Processor (ISP)) 120 receives the image acquired by the camera 110 as input in a unit of a line and processes the image in a unit of the line to generate the viewing image and compressively encoded image. At this time, the image processor 120 extracts an AF Filter Value of the image acquired from the camera 110 in AF control and encodes, if the acquired image is the simple image capable of using the Default Q factor based on the AF Filter Value analysis, the received line images at the default compression rate and, otherwise if the acquired image is the complex image, encodes the line images at a compression rate adjusted with the Q factor. The image processor 120 multiplexes the processed viewing image and compressively encoded image (hereinafter, referred to as compressed image) in the unit of the line and outputs the multiplexed image. At this time, the image processor 120 outputs the viewing image and the compressed image in the unit of the line with header information for differentiating between the viewing image and compressed image.

The Application Processor (AP) 130 demultiplexes and/or parses the viewing and compressed images multiplexed in the unit of the line, buffers the viewing and compressed images in the unit of the frame, and outputs the viewing image to the display unit 150 in the unit of the frame. The AP 130 is capable of including a frame buffer for buffering the compressed image in the unit of the frame, and the frame buffer can be configured to have a size capable of buffering 2 to 5 frames. Here, the reason for buffering the compressed images of 2 to 5 frames is to have little to no shutter lag.

Typically, a camera takes an image delayed a certain number of frames from the timing of the image presented on the viewfinder or display unit 150 due to the shutter delay. For example, there is a delay (e.g., shutter lag or time lag) between triggering the shutter and when the camera actually records an image. The time delay is variable depending on the camera, and the control unit 100 knows the delay time, which may be acquired statistically. According to an exemplary embodiment of the present invention, the camera buffers the images acquired through the camera 110 by taking notice of the shutter lag and selects the frame image taken at the time when the shutter is triggered as a capture image among the buffered images. For example, the camera device according to an exemplary embodiment of the present invention buffers the images acquired by the camera 110 in the preview mode to accomplish zero shutter lag. Assuming that the shutter delay (shutter lag) is 2 frames, it is preferred to configure the frame buffer as a ring buffer capable of buffering 3 frame images. In this case, the frame buffer buffering the compressed images in the preview mode is configured such that the high resolution frame image generated at every frame period overwrites the oldest frame image so as to maintain a predetermine number. If the shutter is pressed (i.e., if a capture image is requested), the AP 130 reads out a compressed image from the compressed image frame buffer in consideration of the shutter lag and stores the read compressed image in the storage unit 140.

The storage unit 140 is a memory for storing the images taken by the camera device and, although the exemplary embodiments of the present invention are directed to the case of storing still images, it may be possible to store motion images. The display unit 150 can be a display device such as a Liquid-Crystal Display (LCD) or a Light-Emitting Diode (LED) and is responsible for displaying the images taken by the camera device and shooting information. The input unit 160 includes plural keys for generating commands to configure and execute functions of the camera device. Here, the keys of the input unit 160 can be provided in the form of buttons arranged outside of the camera device and/or virtual keys presented on a touch panel. In this case, the display unit 150 and the input unit 160 can be integrated into a touchscreen.

Figure 2:
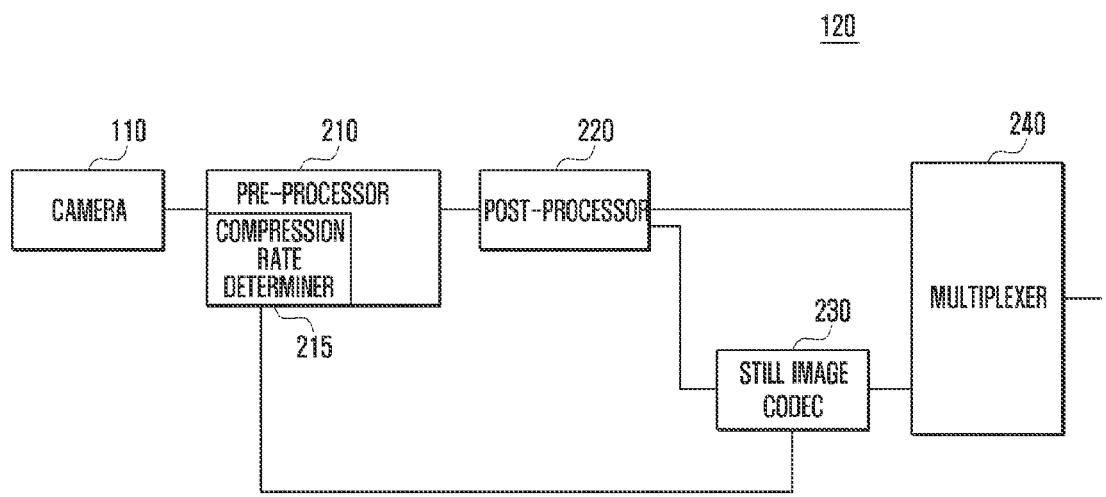
FIG. 2 is a block diagram illustrating a configuration of an image processor, such as the configuration of the image processor of FIG. 1, according to an exemplary embodiment of the present invention.

FIG. 2 is a block diagram illustrating a configuration of an image processor, such as the image processor of FIG. 1, according to an exemplary embodiment of the present invention.

Referring to FIG. 2, the pre-processor 210 pre-processes the line images acquired from the camera 110. Here, the pre-processing function may include 3A (Auto White Balance (AWB), Auto Exposure (AE), and Auto Focusing (AF)) extraction and processing, lens shading correction, dead pixel correction, knee correction, etc. The pre-processor 210 includes a compression rate determiner 215 which extracts the AF Filter Value of the image acquired from the camera 110 in AF and configures a Q factor for encoding the acquired image compressively based on the AF Filter Value analysis.

The post-processor 220 post-processes the pre-processed line images. The post-processor 220 may include a color interpolator, an Image Processing Chain (IPC), and an image converter. The color interpolator performs interpolation on the Bayer data output from the camera to generate a color image. As described above, the image sensor of the camera 110 can be a CCD or a CMOS image sensor. The CCD/CMOS image sensor uses a color filter array and thus for each pixel sensor there is one of the three color channels for generating a color image. The color interpolator performs full color conversion on the pixels of the image output from the camera 110 to generate colors including Red, Green, and Blue (RGB). The color interpolator performs the color interpolation using the correlations among the adjacent pixels, and the image process before the color interpolation is referred to as pre-processing while the image process after the color interpolation is referred to as post-processing. The IPC performs noise reduction, gamma correction, and luminance correction on the color-interpolated images. The image converter converts the post-processed image to a YUV image. For example, the post-processor 220 performs image conversion to a YUC image after color interpolation and post-processing.

The still image codec 230 receives the post-processed line images and encodes compressively the line images based on the Q factor determined by the compression rate determiner 215 of the pre-processor 210. Here, the still image codec 230 encodes the line images at the compression rate determined based on the Q factor output by the compression rate determiner 215 and outputs the adjusted Q table in adjusting the compression rate.

The multiplexer 240 multiplexes the post-processed viewing image (i.e., YUC image) and compressed image output by the still image codec 230. The multiplexer 240 multiplexes the viewing and compressed images along with header information for identifying the viewing and compressed images. The multiplexed line images are converted to a serial data which is sent to the AP 130.

Figure 3:
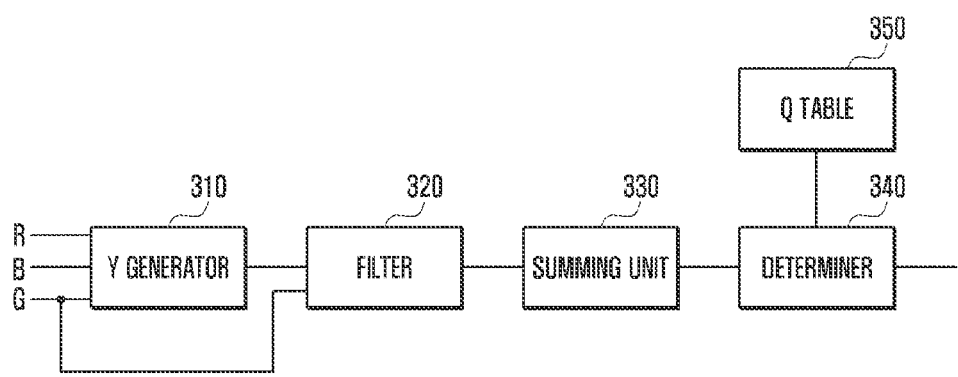
FIG. 3 is a block diagram illustrating a configuration of a compression rate determiner, such as the compression rate determiner of FIG. 2, according to an exemplary embodiment of the present invention.

FIG. 3 is a block diagram illustrating a configuration of a compression rate determiner, such as the compression rate determiner of FIG. 2, according to an exemplary embodiment of the present invention.

Referring to FIG. 3, the luminance generator (Y generator) 310 generates luminance data (Y data) using the Red (R), Green (G), and Blue (B) data output by the camera 110. Here, the reason for generating luminance data is to determine the complexity of the image by extracting the edge components of the image. The filter 320 performs AF filtering on the luminance data (or G data) output from the luminance generator 310 to acquired Auto Focusing (AF) filter value. The filter 420 filters the G data of the image generated by the camera 100 to acquire the AF filter value. In this case, the luminance generator 310 may be omitted. The filter 420 is also capable of filtering the data of a window region (Y data and/or G data) configured in frame image duration. In this case, the configured window can be whole frame images or images at a specific region (or area) of the frame image region. At this time, the specific region (or area) can be specific line images (e.g., at least one line image) of the frame image or a specific region of the frame region. Here, the filter 320 can be implemented with a Finite Impulse Response (FIR) filter and/or an Infinite Impulse Response (IIR) filter. For example, the filter 320 removes the noise by filtering out the lower frequency component and/or high frequency component in AF filtering and generates the AF filter value for detecting the edge component of the image. Here, the filter 320 is capable of AF-filtering all line images or a specific region or line images. The summing unit (e.g., AF sum) 330 sums the AF-filtered values of the pixels output from the filter 320. The Q table 350 stores the Q factors for determining the compression rate of the image according to the complexity of the image. Here, the Q table is capable of storing a default Q factor and other plural Q factors for adjusting the compression rate. The determiner 340 compares the AF sum output by the summing unit 330 and a predetermined threshold value and retrieves the Q factor corresponding to the complexity of the image from the Q table based on the comparison result and outputs the Q factor to the still image codec 230.

Figure 4A:
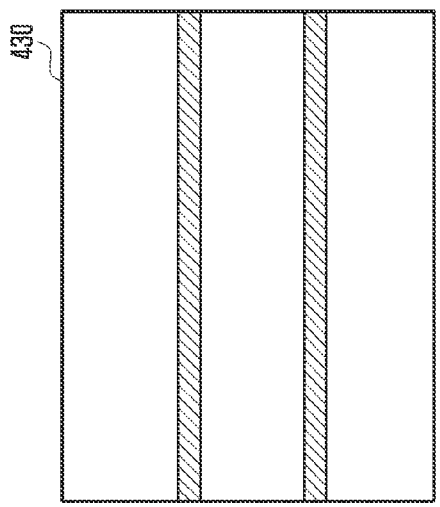
FIG. 4A is a diagram illustrating a principle of configuring a window for determining a compression rate according to an exemplary embodiment of the present invention.
Figure 4A:
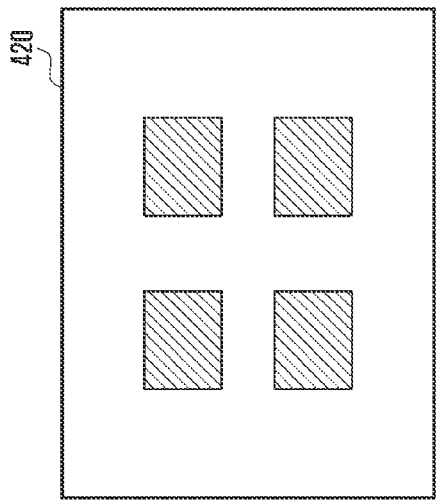
Figure 4A:
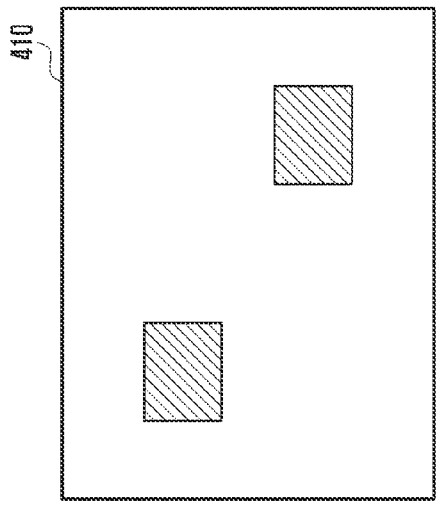

FIGS. 4A and 4B are diagrams illustrating a mechanism of a compression rate determiner, such as the compression rate determiner of FIG. 3, according to an exemplary embodiment of the present invention. In particular, FIG. 4A is a diagram illustrating a principle of configuring a window for determining a compression rate according to an exemplary embodiment of the present invention, and FIG. 4B is a diagram illustrating a principle of retrieving a filter value in a configured window region according to an exemplary embodiment of the present invention.

Referring to FIGS. 4A and 4B, the compression rate determiner 215 configures the entire or a part of the frame image as a window for measuring the complexity of the image and filters the pixels in the window. At this time, the window can be configured to match the size of the entire frame image (i.e., the whole frame image acquired from the camera 110), some regions within the frame image area as denoted by reference number 410 and 420 of FIG. 4A, or at least one line images region as denoted by reference number 430.

First, the Y generator 310 generates Y data using the line images acquired from the camera 110. The filter 320 filters the images (Y data and/or G data of the image output from the camera 110) in auto focusing control and, if the line images are in the window configured as shown FIG. 4A, filters the images to extract the AF filter value. At this time, the AF filter value extracted by the filter 320 may have the values as shown in FIG. 4B. The summing unit 330 sums the AF filter values as shown in FIG. 4B, the determiner 340 compares the summed AF filter value with a predetermined threshold value to determine the complexity of the image and retrieves the Q factor corresponding to the determination result and sends the Q factor to the still image codec 230.

For example, the compression rate determiner 215 extracts the AF filter values in the window configured by the filter 320 in auto-focusing the image acquired by the image sensor of the camera, the summing unit 330 sums the AF filter values, and the determiner 340 analyzes the summed AF filter value to determine the Q factor necessary for image compression. At this time, if it is determined that the image is a simple image capable of using default Q factor based on the AF filter value, the compression rate determiner 215 determines the compression rate to perform JPEG compression at the default compression rate and, otherwise if it is determined that the image is a complex image, the compression rate controlled by adjusting the Q Factor.

Figure 5:
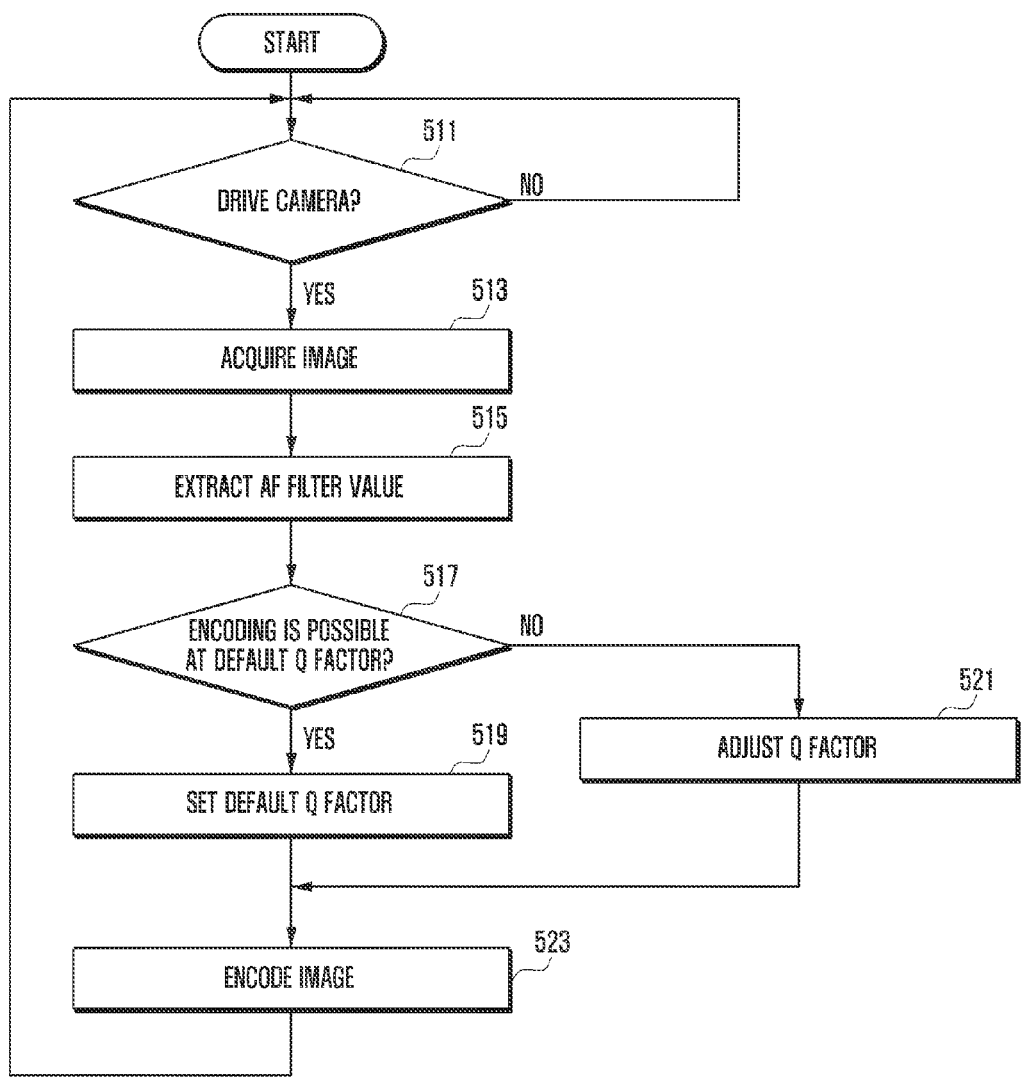
FIG. 5 is a flowchart illustrating a procedure of adjusting a compression rate of an image in a camera device according to an exemplary embodiment of the present invention.

FIG. 5 is a flowchart illustrating a procedure of adjusting a compression rate of an image in a camera device according to an exemplary embodiment of the present invention.

Referring to the configuration of the camera device depicted in FIGS. 1 to 4 and the flowchart of FIG. 5, if the user inputs a camera driving command by means of the input unit 160 of the camera device according to an exemplary embodiment of the present invention, the AP detects this at step 511 and controls the image processor 120 to drive the camera 110. At this time, the camera 110 takes an image at step 513 and, at this time, the image may be a full resolution Bayer image. The image processor 120 processes the image taken by the camera 110 at step 513 and, at this time, the image may be processed at frame rate of 30 frames per second (fps) or higher (e.g., 60 fps).

The pre-processor 210 of the image processor 120 pre-processes the image output by the camera 110 in the unit of the line and, at this time, the pre-processing may include 3A Auto White Balance (AWB), Auto Exposure (AE), and Auto Focusing (AF)) extraction, lens shading correction, dead pixel correction, knee correction, etc. The pre-processed image is sent to the post-processor 220.

The pre-processor 210 analyzes the complexity of the image acquired in AF process to determine the compression rate of the image. For example, the image processor 120 determines the compression rate of the image to be encoded compressively in the unit of the line by means of the compression rate determiner 215. For this purpose, the image processor 120 performs filtering (e.g., FIR and/or IIR filtering) on the luminance data within the window configured as shown in FIG. 4A to extract the AF filter values as shown in FIG. 4B, and sums the AF filter values at step 515. Next, the image processor 120 analyzes the summed AF filter value and determines whether it is possible to encode the image with the default Q factor at step 517. If it is possible to encode the image with the default Q factor, the image processor 120 sets the default Q factor at step 519 and, otherwise if it is not possible to encode the image with the default Q factor, set a Q factor adjusted in adaptation to the AF filter at step 521. Next, the image processor 120 sends the Q factor set as above to the still image codec 230, and the still image codec 230 encodes the line images compressively with the Q factor at step 523.

In the procedure of processing the image at the compression rate configured as above, the line image pre-processed by the pre-processor 210 is input to the post-processor 220. The post-processor 220 performs post-processing operations such as color interpolation, noise reduction, gamma correction, and image conversion on the pre-processed line images. For example, the image processor performs color interpolation to generate pixel data including RGB components, noise correction on the color-interpolated pixel data, and image conversion on the noise-corrected data to generate YUV data.

The still image codec 230 is configured with the compression encoding rate based on the Q factor determined through the procedure of FIG. 5 and encodes the line images output from the post-processor 220 at the configured compression encoding rate. Here, the still image codec 230 can be a still image encoder such as JPEG encoder. Although the exemplary embodiments of the present invention are directed to the case where the still image is the JPEG image, other formats of still images (e.g., a Tagged-Image File Format (TIFF)) also can be used.

At this time, the image output from the post-processor 220 is a YUV image which can be used as a viewing image displayed on the screen of the display unit 150 in the preview mode or motion image recording mode, and the compressed image output by the still image codec 230 can be the still image to be stored in the storage unit 140 in response to the user's capture request. Afterward, the multiplexer 240 multiplexes the viewing and compressed images and outputs the multiplexed images to the AP 130. At this time, the multiplexer 240 outputs the viewing and compressed images in the unit of the line along with the header information for identifying the viewing and compressed images.

The AP 130 demultiplexes and/or parses the viewing and compressed images in the unit of the line that are multiplexed by the image processor 120 and buffers the demultiplexed images in the unit of the frame to display viewing images on the display unit 150 in the unit of the frame. At this time, the viewing image can be the preview image. The AP 130 is also provided with a frame buffer for buffering a predetermined number of frame images. The AP 130 buffers the line images output as compressed by the image processor 120 in the unit of the frame and, at this time, the number of frame images that can be buffered is determined to accomplish little to no shutter lag. Accordingly, the AP 130 overwrites compressed image output by the image processor 120 on the oldest image to maintain the number of frames being buffered.

If a capture request is input in the preview mode or the motion image recording mode, the AP selects the compressed image of the frame corresponding to the shutter press timing in the frame buffer to accomplish little to no shutter lag and stores the selected image in the storage unit 140.

Figure 6:
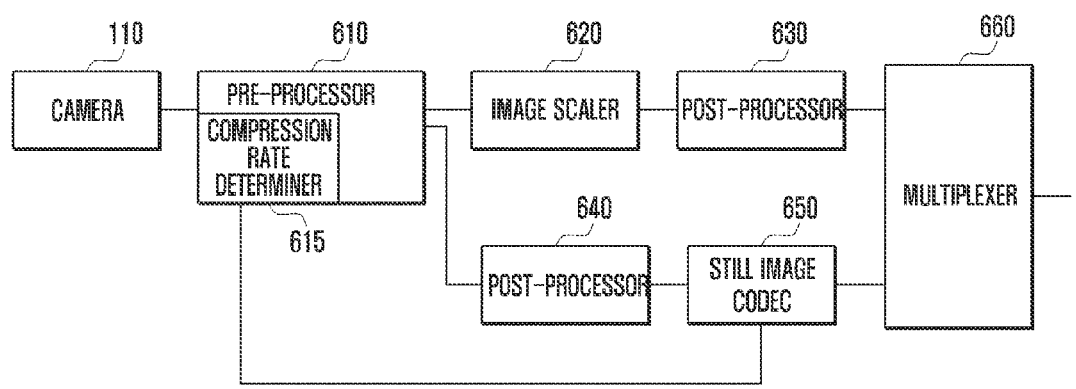
FIG. 6 is a block diagram illustrating a configuration of a camera device according to another exemplary embodiment of the present invention.

FIG. 6 is a block diagram illustrating a configuration of a camera device according to another exemplary embodiment of the present invention.

Referring to FIG. 6, the viewing image and the compressed image may have different sizes in the camera device. The viewing image is the image being displayed on the display unit 130 or stored in the motion image recoding mode, and the compressed image is the still image stored in response to the capture request of the user. Accordingly, the still image can be the image acquired by compressing the YUV image corresponding to the camera's full resolution image or a lesser size image. Typically, the image processor 120 of the camera device may include the image scaler for scaling the image acquired from the camera 110 to a small size image for generating the viewing image as shown in FIG. 6.

In the image processor 120 structured as shown in FIG. 6, if a camera driving command is detected, the camera 110 takes a full resolution image, this image being sent to the pre-processor 610. The pre-processor 610 pre-preprocesses the camera's full resolution image, and the compression rate determiner 615 of FIG. 3 filters the pixels in a configured window to analyzes the complexity of the image and generates a Q factor to the still image codec 650 based on the complexity of the image. At this time, the pre-processor 610 pre-processes the images in the unit of the line image as described above and, at this time, the pre-processing may include 3A (Auto White Balance (AWB), Auto Exposure (AE), and Auto Focusing (AF)) extraction, lens shading correction, dead pixel correction, knee correction, etc.

The image scaler 620 scales the pre-processed line image to a predetermined size and, at this time, the image scaling is performed such that the camera's full resolution image is scaled to be fit for the screen size of the display unit 130. Here, the image scaling can be performed with at least one of resizing, decimation, interpolation, crop, and summing and averaging. The image scaler 620 reduces the number of pixels of the full resolution image acquired from the camera 110 so as to be fit for the screen size of the display unit 150 or the aspect ratio of the display unit 150. Here, the image scaling can be performed at various aspect ratios.

The scaled line image is post-processed by the post-processor 630. The post-processing may include color interpolation, noise reduction, gamma correction, image conversion, etc.

The full resolution image pre-processed in the unit of the line is sent to the post-processor 640. The post-processor 640 may operate in the same way as the post processor 630 which the exception of the size of the image being processed. For example, the post-processor 630 post-processes the image-scaled line images while the post-processor 640 post-processes the camera's full resolution image (or an image having a size preset by the user). The still image codec 650 encodes the image output from the post-processor 640 at the coding rate (e.g., compression rate) determined by the compression rate determiner 615.

Afterward, the multiplexer 660 multiplexes the viewing image and the compressed image and outputs the multiplexed images to the AP 130. At this time, the multiplexer 660 outputs the viewing and compressed images along with header information for discriminating among the images.

As described above, the image encoding apparatus and method of the present disclosure is capable of adjusting the compression rate of the line image using the AF function of the camera device equipped with an image processor processing images in the unit of the line. The image processor of the camera device estimates the size of the image based on the auto-focusing result value in acquiring the image from the camera and adjusts the compression rate based on the estimated image size, thereby compressing the image efficiently.

It will be appreciated that exemplary embodiments of the present invention according to the claims and description in the specification can be realized in the form of hardware or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and exemplary embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image processing apparatus of a camera, the apparatus comprising:
  a table which stores one or more factors for determining compression rate of an image;
  a processor which processes an image acquired from the camera in a unit of a line, and determines a complexity of the image using edge data of the image;
  a compression rate determiner which configures at least a part of the image acquired from the camera as a window, extracts auto focus filter values by filtering pixels in the window, and identifies, in the table, a factor corresponding to the complexity of the image by comparing the auto focus filter values with a predetermined value; and
  a still image codec which compresses line images output from the processor at a compression rate corresponding to the identified factor.

2. The apparatus of claim 1, wherein the compression rate determiner comprises:
  a filter which generates the auto focus filter values by filtering luminance data or Green (G) data of the image acquired from the camera;
  a summing unit which sums the auto focus filter values; and
  a determiner which analyzes the summed auto focus filter value to identify the factor for adjusting the compression rate according to the complexity of the image.

3. The apparatus of claim 1, wherein the processor comprises:
a pre-processor which corrects auto exposure and focus, lens shading, and dead pixels of the image acquired from the camera; and
a post-processor which performs color interpolation and image conversion on the pre-processed image.

4. The apparatus of claim 1, wherein the processor comprises:
a pre-processor which corrects auto exposure and focus, lens shading, and dead pixels of the image acquired form the camera;
an image scaler which scales the pre-processed image to a size of a display screen;
a first post-processor which performs color interpolation and image conversion on the scaled image; and
a second post-processor which performs color interpolation and image conversion on the pre-processed image and sends the post-processed image to the still image codec.

5. The apparatus of claim 1, further comprising multiplexing viewing and the compressed images as line images and sending the multiplexed images to an application processor.

6. The apparatus of claim 5, wherein the multiplexed images include header information for identifying the viewing and compressed images.

7. An image processing method of a camera including a table which stores one or more factors for determining compression rate of an image, the method comprising:
processing an image acquired from the camera in a unit of a line;
determining a complexity of the image using edge data of the image;
configuring at least a part of the image acquired from the camera as a window;
extracting auto focus filter values by filtering pixels in the window;
identifying, in the table, a factor corresponding to the complexity of the image by comparing the auto focus filter values with a predetermined value; and
compressing the processed line images at the compression rate corresponding to the identified factor.

8. The method of claim 7, wherein the identifying of the factor comprises:
generating the auto focus filter values by filtering luminance data or Green (G) data of the image acquired from the camera;
summing the auto focus filter values; and
identifying the factor for adjusting the compression rate according to the complexity of the image by analyzing the summed auto focus filter value.

9. The method of claim 7, wherein the processing of the image comprises:
pre-processing the image to correct auto exposure and focus, lens shading, and dead pixels of the image acquired from the camera; and
post-processing the pre-processed image through color interpolation and image conversion.

10. The method of claim 7, wherein the processing of the image comprises:
pre-processing the image to correct auto exposure and focus, lens shading, and dead pixels of the image acquired form the camera;
scaling the pre-processed image to a size of a display screen;
post-processing the scaled image through color interpolation and image conversion on the scaled image; and
post-processing the pre-processed image through color interpolation and image conversion.

11. The method of claim 7, further comprising multiplexing viewing and the compressed images as line images and sending the multiplexed images to an application processor.

12. The method of claim 11, wherein the multiplexed images include header information for identifying the viewing and compressed images.

13. At least one non-transitory processor readable medium for storing a computer program of instructions configured to be readable by at least one processor for instructing the at least one processor to execute a computer process for performing the method as recited in claim 7.

* * * * *